US012333928B2

(12) United States Patent
Murphy et al.

(10) Patent No.: US 12,333,928 B2
(45) Date of Patent: *Jun. 17, 2025

(54) SYSTEMS AND METHODS FOR WAYFINDING IN HAZARDOUS ENVIRONMENTS

(71) Applicant: JPMORGAN CHASE BANK, N.A., New York, NY (US)

(72) Inventors: Matthew Murphy, Wigan (GB); Rocky J Maufort, West Chester, PA (US); Marco Pistoia, Amawalk, NY (US); Bill Moriarty, West Chester, PA (US); Shaohan Hu, Yorktown Heights, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,130

(22) Filed: Mar. 8, 2024

(65) Prior Publication Data

US 2024/0221477 A1 Jul. 4, 2024

Related U.S. Application Data

(63) Continuation of application No. 17/516,276, filed on Nov. 1, 2021, now Pat. No. 11,972,681.

(51) Int. Cl.
*G08B 7/06* (2006.01)
*G01C 21/20* (2006.01)
(Continued)

(52) U.S. Cl.
CPC ............ *G08B 7/062* (2013.01); *G01C 21/206* (2013.01); *G08B 25/016* (2013.01); *H04W 4/90* (2018.02)

(58) Field of Classification Search
CPC ....... G08B 7/062; G08B 25/016; H04W 4/90; G01C 21/206
(Continued)

(56) References Cited

U.S. PATENT DOCUMENTS 3,817,161 A * 6/1974 Koplon ................... A62C 3/04
454/342
8,994,540 B2 * 3/2015 Fadell ................. G08B 17/113
340/691.1
(Continued)

*Primary Examiner* — Zhen Y Wu
(74) *Attorney, Agent, or Firm* — GREENBERG TRAURIG LLP

(57) ABSTRACT

Systems and methods for wayfinding in hazardous environments are disclosed. In one embodiment, a method for wayfinding in a hazardous environment may include: (1) receiving, at an emergency response computer program executed by an electronic device, a plurality of real time streams of data, each real time stream of data from a sensing device in an area; (2) detecting, by the emergency response computer program, an alarm condition in the area based on the real-time streams of data; (3) determining, by the emergency response computer program, that the alarm condition satisfies an alarm condition rule; (4) calculating, by the emergency response computer program, a plurality of routes to an egress point from the area; and (5) controlling, by the emergency response computer program, a digital signage in the area to display one of the plurality of routes the egress point.

18 Claims, 3 Drawing Sheets

(51) Int. Cl.
*G08B 25/01* (2006.01)
*H04W 4/90* (2018.01)

(58) Field of Classification Search
USPC .............................................. 340/691.1, 691
See application file for complete search history.

(56) References Cited

U.S. PATENT DOCUMENTS

| | | | | |
|---|---|---|---|---|
| 9,080,883 B2* | 7/2015 | Frey | .................... | G08B 27/006 |
| 9,257,023 B2* | 2/2016 | Lee | ........................ | G08B 7/066 |
| 9,681,280 B2* | 6/2017 | Balthasar | ................ | H04W 8/24 |
| 9,799,205 B2* | 10/2017 | Wedig | .................... | G08B 25/10 |
| 9,898,912 B1* | 2/2018 | Jordan, II | ................ | H04W 4/02 |
| 9,980,111 B2* | 5/2018 | Miyata | .................... | G08B 25/10 |
| 9,983,011 B2* | 5/2018 | Mountain | ............... | G08B 7/066 |
| 10,026,278 B1* | 7/2018 | Asaro | .................... | G01C 21/206 |
| 10,297,125 B2* | 5/2019 | McDonagh | ............. | G09F 13/04 |
| 10,473,471 B2* | 11/2019 | Imoto | .................... | G06Q 10/0635 |
| 10,621,839 B2* | 4/2020 | Vazirani | .................... | G08B 29/188 |
| 10,657,797 B2* | 5/2020 | Wedig | .................... | G08B 7/066 |
| 10,769,902 B1* | 9/2020 | Kronz | .................... | G08B 7/062 |
| 11,166,338 B2* | 11/2021 | Wang | .................... | H04W 4/90 |
| 2007/0049259 A1* | 3/2007 | Onishi | .................... | H04W 4/90 |
| | | | | 455/414.2 |
| 2007/0279242 A1* | 12/2007 | Plocher | .................... | G08B 3/10 |
| | | | | 340/332 |
| 2008/0285797 A1* | 11/2008 | Hammadou | ........... | G06V 20/52 |
| | | | | 382/103 |
| 2009/0001891 A1* | 1/2009 | Patterson | ............... | G08B 7/066 |
| | | | | 315/129 |
| 2009/0184244 A1* | 7/2009 | Drews | .................... | A62B 3/00 |
| | | | | 250/330 |
| 2010/0057354 A1* | 3/2010 | Chen | .................... | G01C 21/206 |
| | | | | 340/995.19 |
| 2011/0112660 A1* | 5/2011 | Bergmann | ............... | G08B 7/066 |
| | | | | 700/29 |
| 2013/0099919 A1* | 4/2013 | Cai | ........................ | G08B 7/066 |
| | | | | 340/539.13 |
| 2013/0282280 A1* | 10/2013 | Patterson | ............. | G08B 25/003 |
| | | | | 701/533 |
| 2014/0139539 A1* | 5/2014 | Byers | .................... | G08B 7/062 |
| | | | | 345/589 |
| 2014/0222329 A1* | 8/2014 | Frey | .................... | G08B 7/066 |
| | | | | 701/423 |
| 2014/0253317 A1* | 9/2014 | Wedig | .................... | G08B 25/006 |
| | | | | 340/521 |
| 2014/0253326 A1* | 9/2014 | Cho | ........................ | H04W 4/90 |
| | | | | 340/539.11 |
| 2014/0293865 A1* | 10/2014 | Shi | ........................ | H04W 4/90 |
| | | | | 370/312 |
| 2015/0065078 A1* | 3/2015 | Mejia | .................... | G08B 17/00 |
| | | | | 455/404.1 |
| 2015/0137967 A1* | 5/2015 | Wedig | .................... | G08B 17/10 |
| | | | | 340/501 |
| 2015/0163412 A1* | 6/2015 | Holley | .................... | G08B 25/008 |
| | | | | 348/143 |
| 2015/0170503 A1* | 6/2015 | Wedig | .................... | G08B 7/066 |
| | | | | 340/691.5 |
| 2015/0348220 A1* | 12/2015 | Sharma | .................... | G01C 21/3407 |
| | | | | 705/324 |
| 2016/0018226 A1* | 1/2016 | Plocher | .................... | G09G 3/3208 |
| | | | | 345/82 |
| 2016/0027266 A1* | 1/2016 | McDonagh | ............. | G08B 7/062 |
| | | | | 340/815.4 |
| 2016/0049064 A1* | 2/2016 | McNabb | .................... | G01C 21/206 |
| | | | | 340/540 |
| 2016/0321883 A1* | 11/2016 | Tsukamoto | ............ | G08B 7/066 |
| 2017/0032632 A1* | 2/2017 | Joseph | .................... | H04W 4/90 |
| 2017/0059343 A1* | 3/2017 | Spinelli | .................... | G01C 21/20 |
| 2017/0304659 A1* | 10/2017 | Chen | .................... | G08B 7/066 |
| 2017/0309142 A1* | 10/2017 | Phillips | ............... | G08B 13/1672 |
| 2018/0040232 A1* | 2/2018 | Wedig | .................... | G08B 17/10 |
| 2018/0080778 A1* | 3/2018 | Tadano | .................... | G01C 21/3605 |
| 2018/0356241 A1* | 12/2018 | Correnti | .................... | H04L 67/12 |
| 2019/0020978 A1* | 1/2019 | Finschi | .................... | G01C 21/206 |
| 2019/0066464 A1* | 2/2019 | Wedig | .................... | G08B 27/001 |
| 2019/0122509 A1* | 4/2019 | Beller | .................... | G09B 21/009 |
| 2019/0266860 A1* | 8/2019 | Lakshmipathy | .. | H04M 1/72463 |
| 2019/0279478 A1* | 9/2019 | Ebata | .................... | G06N 3/045 |
| 2019/0289263 A1* | 9/2019 | Amini | ............. | G08B 13/19656 |
| 2019/0295397 A1* | 9/2019 | Eckert | .................... | G08B 5/36 |
| 2019/0353490 A1* | 11/2019 | Tadano | .................... | G01C 21/20 |
| 2020/0388120 A1* | 12/2020 | Paturu | .................... | H04W 4/029 |
| 2020/0410844 A1* | 12/2020 | Wedig | .................... | G01C 21/206 |
| 2021/0049789 A1* | 2/2021 | Bonn | .................... | G06V 20/52 |
| 2021/0082079 A1* | 3/2021 | Shrivastava | ......... | G06Q 90/205 |
| 2021/0183219 A1* | 6/2021 | Rao | ........................ | G08B 7/066 |
| 2021/0208949 A1* | 7/2021 | Bijwe | .................... | G06F 9/5005 |
| 2021/0248883 A1* | 8/2021 | Ellis | .................... | G08B 7/066 |
| 2021/0279603 A1* | 9/2021 | Teran Matus | .......... | G06V 20/40 |
| 2021/0383666 A1* | 12/2021 | Tanaka | .................... | G08B 29/183 |
| 2022/0092720 A1* | 3/2022 | Henry | .................... | G06F 16/24575 |

\* cited by examiner

SYSTEMS AND METHODS FOR WAYFINDING IN HAZARDOUS ENVIRONMENTS

RELATED APPLICATIONS

This application is a continuation of U.S. patent application Ser. No. 17/516,276, now U.S. Pat. No. 11,972,681, filed Nov. 1, 2021, the disclosure of which is hereby incorporated, by reference, in its entirety.

BACKGROUND OF THE INVENTION

1. Field of the Invention

Embodiments relate generally to systems and methods for wayfinding in hazardous environments.

2. Description of the Related Art

Fire detection and life safety systems have never been higher on the agenda for building owners and managers. Compliance with current fire safety legislation is mandatory to provide total safety for building users, but these systems use pre-prescribed routes, so are very static in nature and are limited to the hazards that they can detect and respond to. Current fire safety systems work on the concept of providing a person with the quickest way out of a burning building, but the quickest way out is not necessarily the safest way out of the building in relation to the threat of fire or the volume of people trying to use that particular exit route. The emergency voice communication system raises an alarm to let users know that there is an emergency, fire suppression systems and portable fire extinguishers are used to combat the fire and users follow fixed signage or lighting that indicates the closest emergency exit. The person could be walking towards the fire because attributes like heat, smoke and harmful gases are not considered when directing a user to safety.

SUMMARY OF THE INVENTION

Systems and methods for wayfinding in hazardous environments are disclosed. In one embodiment, a method for wayfinding in a hazardous environment may include: (1) receiving, at an emergency response computer program executed by an electronic device, a plurality of real time streams of data, each real time stream of data from a sensing device in an area; (2) detecting, by the emergency response computer program, an alarm condition in the area based on the real-time streams of data; (3) determining, by the emergency response computer program, that the alarm condition satisfies an alarm condition rule; (4) calculating, by the emergency response computer program, a plurality of routes to an egress point from the area; and (5) controlling, by the emergency response computer program, digital signage in the area to display one of the plurality of routes the egress point.

In one embodiment, the sensing devices comprise a temperature sensor, a smoke detector, and/or a carbon monoxide detector.

In one embodiment, the sensing devices comprise a microphone.

In one embodiment, the sensing devices comprise an imaging device.

In one embodiment, the real-time streams comprise raw data from the sensing device, wherein the raw data may include a sensing device identifier, a sensed data, and a timestamp.

In one embodiment, the real-time streams comprise a trigger event comprising a sensing device identifier, a trigger condition, and a timestamp.

In one embodiment, the alarm condition may be associated with a fire or a violence incident.

In one embodiment, the alarm condition rule may include a breach period requirement.

In one embodiment, the emergency response computer program calculates the plurality of routes to the egress point from the area using a graph representing the area comprising a plurality of nodes and a plurality of edges connecting the nodes.

In one embodiment, the method may further include receiving, by the emergency response computer program, a location of an electronic device in the area; calculating, by the emergency response computer program, a route from the location of the electronic device to the egress point from the area; and sending, by the emergency response computer program, the route to the electronic device.

In one embodiment, the method may further include monitoring, by the emergency response computer program, a traffic volume to the egress point; determining, by the emergency response computer program, that the traffic volume exceeds a threshold; calculating, by the emergency response computer program, a second route to a second egress point; and controlling, by the emergency response computer program, a subset of the digital signage in the area to display the second route to the second egress point.

In another embodiment, a system may include a plurality of sensing devices in an area; digital signage in the area; and an electronic device comprising a memory storing an emergency response computer program and a computer processor. The emergency response computer program receives a real-time stream of data from each of the plurality of sensing devices; the emergency response computer program detects an alarm condition in the area based on the real-time streams of data; the emergency response computer program determines that the alarm condition satisfies an alarm condition rule; the emergency response computer program calculates a plurality of routes to an egress point from the area; and the emergency response computer program controls the digital signage in the area to display one of the plurality of routes the egress point.

In one embodiment, the sensing devices comprise a temperature sensor, a smoke detector, a carbon monoxide detector, an imaging device and/or a microphone.

In one embodiment, the electronic device may be a cloud-based electronic device.

In one embodiment, the real-time streams comprise raw data from the sensing device, wherein the raw data may include a sensing device identifier, a sensed data, and a timestamp.

In one embodiment, the real-time streams comprise a trigger event comprising a sensing device identifier, a trigger condition, and a timestamp.

In one embodiment, the alarm condition may be associated with a fire or a violence incident.

In one embodiment, the alarm condition rule may include a breach period requirement.

In one embodiment, the emergency response computer program calculates the plurality of routes to the egress point from the area using a graph representing the area comprising a plurality of nodes and a plurality of edges connecting the nodes.

In one embodiment, the emergency response computer program further receives a location of an electronic device in the area, calculates a route from the location of the electronic device to the egress point from the area, and sends the route to the electronic device.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
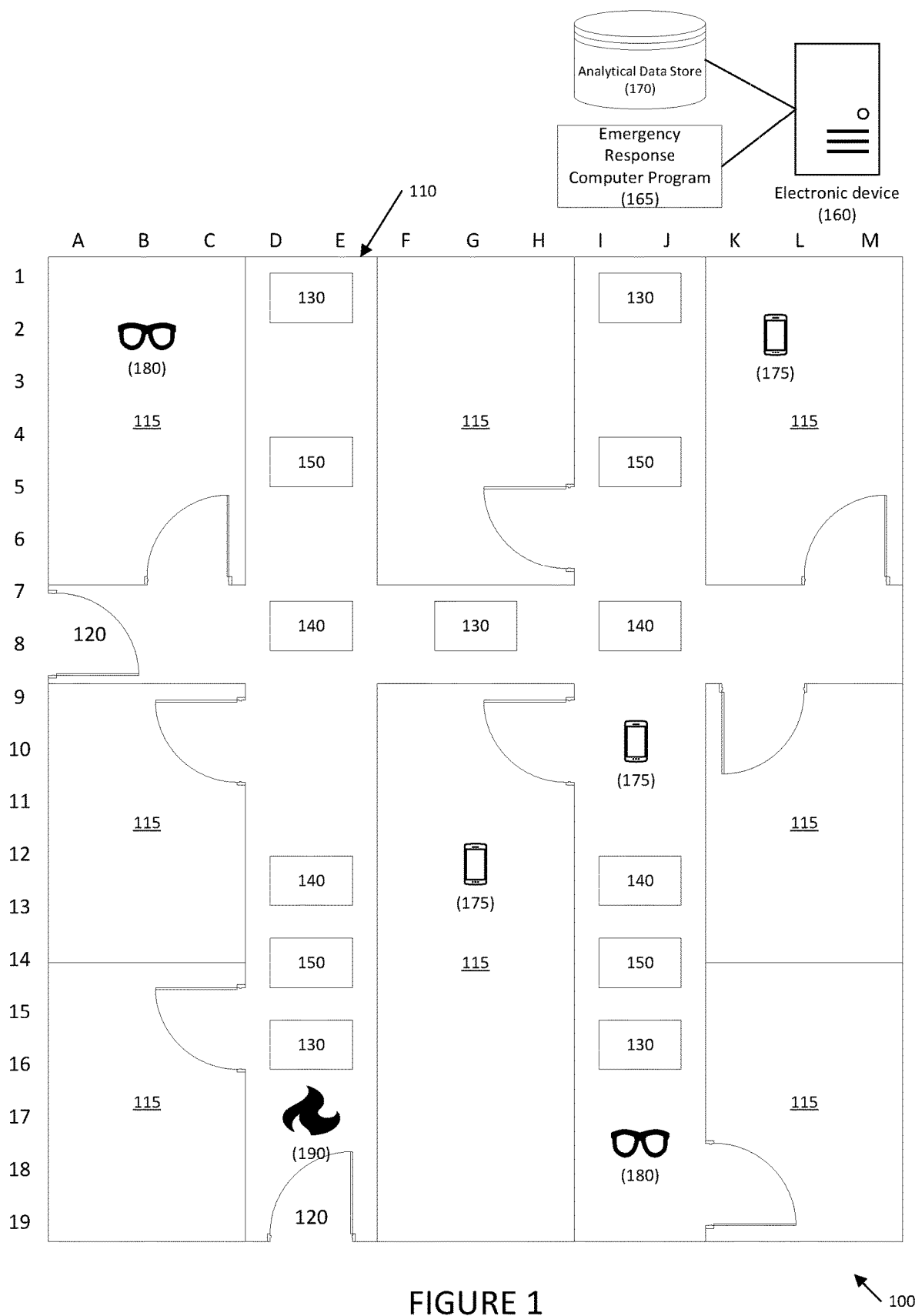
FIG. 1 depicts a system for wayfinding in hazardous environments according to an embodiment.

Embodiments relate generally to systems and methods for wayfinding in hazardous environments.

The Internet of Everything (IoE) is emerging as a significant development in both information technology and operational technology, with the potential to increase convenience, efficiency, and safety. The IoE allows companies bridge the physical and digital worlds, ingesting information, and context through sensors from the physical world into the digital and taking actions in the physical world based on digital insights. In embodiments, IoE appliances, such as heat sensors, smoke detectors, carbon monoxide detectors, occupancy sensors, etc. may be combined with microphones, intelligent lighting, digital signage systems, etc. to provide a dynamic fire detection and life safety system. Embodiments may use the data points provided by the IoE appliances and other sensors to direct individuals to the quickest and safest way out of a burning building, or directions away from another hazard.

Embodiments may coordinate all IoE sensors in a building, digital signage, lighted pathways, etc. into a system to direct people to the safest evacuation path during an emergency. Embodiments may adapt to different hazards.

In the event of a fire, an emergency voice communication system raises an alarm to let individuals know that there is an emergency. An emergency response computer program receives data points from the heat, smoke and carbon monoxide sensors and determines the location of the fire and any affected exit routes. The data points allow for the generation of a detailed voice communication that can be provided to the user. For example, embodiments may identify the type of hazard and a location of the hazard, such as "fire detected on the second floor, in the north west corner." This not only helps people know and understand the hazard, but, because people know more, may reduce the likelihood of panicking.

The emergency response computer program may further control fire suppression systems to target the fire and any areas that are directly affected.

The emergency response computer program may control digital signage and lighting to guide individuals to the safest and quickest exit route. For example, the digital signage and lighting system may use arrows to direct the individuals through the physical environment, which enhances their safety when exiting the space. The digital signage and lighting may dynamically change based on the sensed data provided from the IoE appliances with regard to the sensed heat, smoke, and/or carbon monoxide density, so individuals are steered away from the threat based on real-time data collected from these hazards.

As used herein, the term "and/or" may encompass the conjunctive and disjunctive. Thus, heat, smoke, and/or carbon monoxide density may mean one or more of heat, smoke, and carbon monoxide density.

In embodiments, to avoid crushing incidents and over capacity due to the volume of individuals at emergency exits then occupancy data, individual counting and heat mapping may be used by the emergency response computer program to determine when an exit or a route is at capacity. The emergency response computer program may then dynamically change the digital signage and/or lighting system to provide another exit route that has a lesser volume of individuals.

To provide enhanced life safety in relation to non-fire incidents, such as firearms incidents, intrusions, etc., the emergency response computer program may receive sound data from a microphone array and may identify impulsive sounds such as glass breaks, human screams, gunshots, or explosions. The emergency response computer program may evaluate these sounds evaluated against a base of known hazard sounds. For example, when a gunshot signal has been identified, the sound may be measured in decibels (dB) on a logarithmic scale, which allows the emergency response computer program to triangulate the position of the source of the gunshot. The emergency response computer program may report the position to emergency services and may be used to control the dynamic signage, lighting, and/or speakers to direct individuals away from the position, or to instruct them to shelter in place. As the emergency response computer program receives additional data, such as additional sound data, it may track the movement of the source of the sound throughout the facility.

In one embodiment, imaging devices, such as cameras, may further detect the presence of weapons and may provide additional data to the emergency response computer program. In one embodiment, object recognition with deep learning may be used, and a machine learning engine may be trained to distinguish between three computer vison tasks: image classification, object localization, and object detection. Deep neural network models may be used to detect and label objects in images.

Image classification may involve predicting a class of an object in an image stream, such as a weapon type (e.g., gun, knife etc.). Object localization refers to identifying the location of one or more objects in an image stream. Object detection combines these two tasks to detect the weapon.

Embodiments may use cloud Machine Learning Services, such as Amazon REKOGNITION, Microsoft COMPUTER VISION API, Google CLOUD VISION API, or may use a private cloud.

Referring to FIG. 1, a system for wayfinding in hazardous environments is provided according to an embodiment. System 100 may include area 110, which may be any suitable area, such as a house, a building, a stadium, a theater, an outdoor venue, etc. Area 110 may include any number of floors, staircases, etc. For illustrative purposes only, area 110 is depicted as a single floor of an office building.

In one embodiment, area 110 may be modeled using a Cartesian coordinate system with the x and y coordinates used to identify a position on the floor, and the z coordinate identifying floor number. For example, in FIG. 1, letters A-M identify the x coordinate, numbers 1-19 identify the y coordinate, and 3 may identify the z-coordinate, the floor number Any suitable coordinate system or mapping convention may be used as is necessary and/or desired.

Area 110 may include plurality of subareas 115, such as offices, rooms, sub-areas, etc. Area 110 may have one or more ingress/egress points 120. In one embodiment, ingress/egress points 120 may provide entry or exit to area 110, access to another floor or section, etc. Egress points 120 may provide access to an exterior point of safety, may provide a route to a point of safety, etc.

Area 110 may be provided with one or more sensing device 130, such as IoE devices (e.g., smoke detectors, carbon monoxide detectors, heat detectors, person (e.g., traffic) detectors), sensors (e.g., microphones, cameras, etc.), etc. Sensing devices 130 may provide data to emergency response computer program 165.

Sensing devices 130 may be identified using the x, y, and z coordinate system as discussed above.

Sensing devices 130 may provide raw data (e.g., temperature, carbon monoxide concentration, smoke concentration, sounds, etc.) to the emergency response computer program. In another embodiment, sensing devices 130 may create an event in response to a sensing exceeding a threshold, such as a high temperature, high concentration of carbon monoxide or smoke, sounds above a certain dB, etc., and may communicate an event to the emergency response computer program. For example, if a temperature sensing device 130 detects a high temperature, it may communicate an event with an identifier for the sensing device 130 (e.g., sensing device x, y, z), the temperature, and a timestamp.

Area 110 may further include dynamic signage or lighting 140, which may be controlled by emergency response computer program 165 to display information to individuals in area 110. For example, dynamic signage or lighting 140 may display information such as directions to the nearest and/or safest ingress/egress point 120.

In one embodiment, dynamic signage or lighting 140 may further include a speaker that may provide audible instructions to individuals within area 110.

Area 110 may further include suppression systems 150, such as fire suppression systems, fire doors, etc. In embodiments, emergency response computer program 165 may control suppression systems 150 to respond to a fire or other threat.

Electronic device 160 may be any suitable electronic device, including servers (cloud-based, physical, combinations, etc.), computers (e.g., workstations, desktop computers, etc.) that may execute emergency response computer program 165. Electronic device 160 may execute emergency response computer program 165 that may receive data from sensing devices 130. Emergency response computer program 165 may process the data received from sensing devices 130 and may identify a location of a hazard, such as a fire, heat, smoke, carbon monoxide build-up, flooding, violence events (e.g., gunshots, intruders, etc.), etc. For example, emergency response computer program 165 may identify a location of a fire based on the detection of smoke and heat from one or more sensing device 130. Emergency response computer program 165 may further use an order of detection by a plurality of sensing devices 130 to determine a direction of movement of the fire.

Embodiments provide real-time data processing or data streaming system where emergency response computer program 165 may process signals from sensing devices 130. In embodiments, real-time processing may receive a continual flow of data (e.g., heat, smoke, carbon monoxide, computer vision inputs etc.) from sensing devices 130 and constant processing of the data by emergency response computer program 165 to provide a steady output of data that determines the safest evacuation route.

The data from sensing devices 130 may be ingested using a distributed event streaming platform. The real-time data processing processes the data with minimal latency to generate automated responses or real-time decisioning. The processed data may be written to analytical data store 170, which may be optimized for analytics and visualization.

Emergency response computer program 165 may receive raw data or events from sensing devices 130, and may check each event received to see if it triggers an alarm condition. Alarm condition rules may have a minimum, a maximum, and a required breach period before an alarm condition is triggered. For example, if the maximum temperature was set to 150 degrees F. for 5 mins, emergency response computer program 165 may compare the temperature and timestamp provided in the event stream to determine when to trigger then alarm.

Emergency response computer program 165 may determine, for a plurality of points within area 110, an escape route. In one embodiment, after identifying a location of the hazard, emergency response computer program 165 may use a model of the floor (e.g., nodes and edges) to identify the route. Emergency response computer program 165 may identify the location of the hazard as one or more nodes and may determine routes to ingress/egress points 120 that avoid those nodes.

Emergency response computer program 165 may run perpetual queries against the ingested data. It may filter and aggregate that data to dynamically identify hazards and to provide the safest route out of the building, avoiding the identified hazards. It may modify the routes as necessary in response to changing conditions (e.g., changing hazards, new hazards, etc.).

Emergency response computer program 165 may control dynamic signage or lighting 140 to display the routes at various locations within area 110. In one embodiment, as emergency response computer program 165 receives additional data, such as updates in location, contested areas from people sensors, etc., emergency response computer program 165 may control dynamic signage or lighting 140 to display updated routes as is necessary and/or desired.

In one embodiment, emergency response computer program 165 may further use data from drills, such as fire drills, to determine the route(s). For example, the route may not be based solely on the shortest distance, but may be based on times detected during the drills. Further, emergency response computer program 165 may consider the volume of individuals sensed by people sensors in area 110 to predict which routes will be at or above capacity, and may modify the routes accordingly.

In embodiments, individuals may install an application on their mobile devices 175. Used in conjunction with location-sensing technology, such as BLE beacons, ultrawide band technology, WiFi triangulation, GPS, etc. the application may provide data about the location of its mobile device 175. During drills, this data may be used to determine the effectiveness of the route. The data my further be used to track the locations of individuals as well as their progress in evacuating area 110.

Emergency response computer program 165 may further send notifications to mobile devices 175, such as text messages, in-app messages, etc. In embodiments, specific directions may be provided based on the location of mobile device 175. The notifications to mobile device 175 may assist hearing impaired employees to raise the initial alarm and to help them nav but then help to navigate the safest route out of area 110.

Embodiments may further send messages to augmented reality devices 180, such as augmented reality glasses.

By delivering evacuation routes to personal devices (e.g., mobile devices 175, augmented reality devices 180, etc.), the evacuation path can be tailored to each individual's location and ability. For example, if the individual is wheelchair-bound, the individual may receive a different recommended path than someone without a wheelchair.

In embodiments, an individual may send a notification (in-app, SMS, etc.) to alert a monitoring center of an individual that may be in need of assistance.

In embodiments, if the safest option is to remain in place (e.g., active shooter close by, the location of the hazard does not provide an escape route, etc.), emergency response computer program 165 may indicate such using dynamic signage or lighting 140, speakers, mobile device(s) 175, etc.

Emergency response computer program 165 may further consider activities on other floors, outside area 110, etc. and may calculate routes accordingly.

Figure 2:
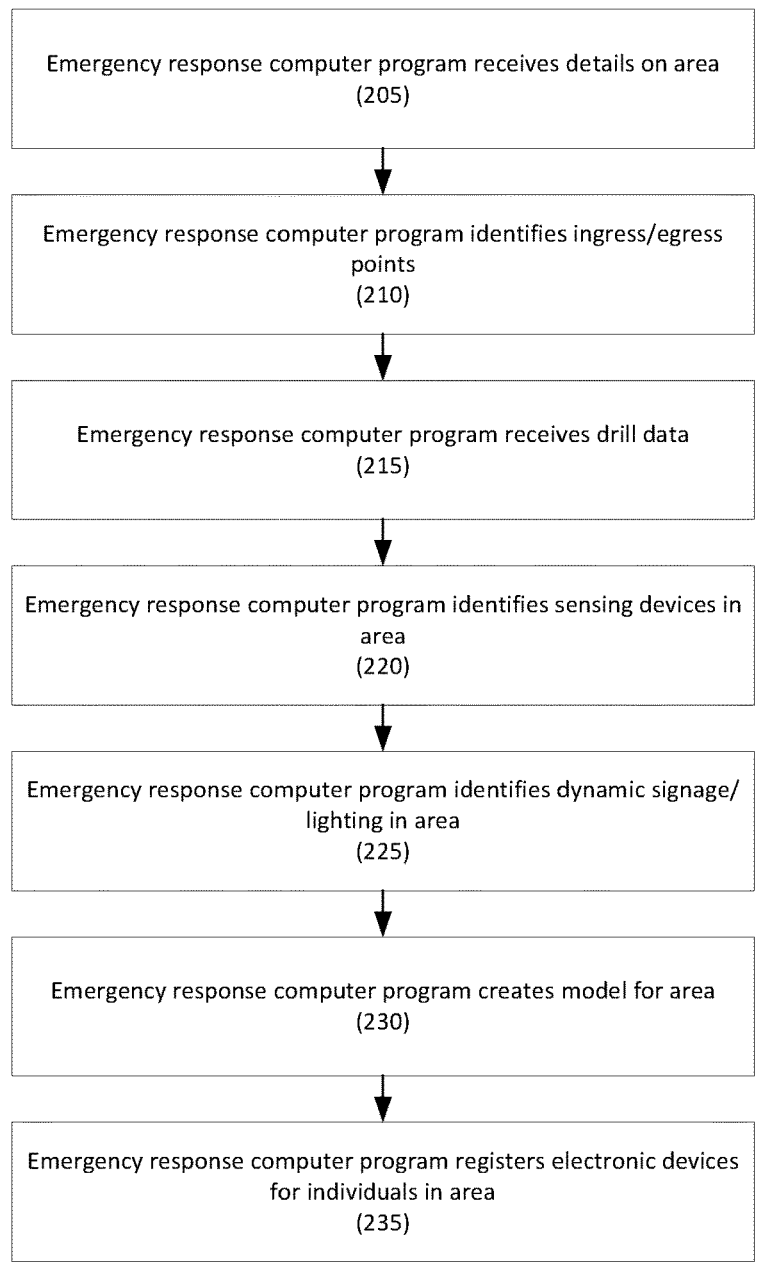
FIG. 2 depicts a method for modeling an area according to an embodiment.

Referring to FIG. 2, a method for modeling an area is provided according to an embodiment.

In step 205, an emergency response computer program may receive details on an area. For example, the emergency response computer program may receive floorplan information, including locations of offices, doors, stairways, number of floors, hallways, windows, etc.

In step 210, the emergency response computer program may identify ingress/egress points from the area. The ingress/egress points may be identified from the floorplan, or they may be manually identified. Examples may include doors, ground level windows, escape ladders, etc.

In one embodiment, the location of each egress point may be assigned to a node in a model of the area. Various points within the area, such as offices, congregation areas, etc. may also be assigned to be a node.

In step 215, the emergency response computer program may optionally receive drill data. For example, the emergency response computer program may receive data on evacuation routes, people density at different points, bottlenecks, etc. In one embodiment, the emergency response computer program may receive timing data from fire drills and similar activities.

In one embodiment, the drill data may be used to assign a default weighting to the edges that connect two nodes based on the speed or flow between the nodes.

In step 220, the emergency response computer program may identify sensing devices in area. Examples include smoke detectors, heat detectors, carbon monoxide sensors, cameras, microphones, etc. The location of each sensing device may be assigned a node within the area. In another embodiment, the location for each sensing device may be associated with an existing node in the area.

In step 225, the emergency response computer program may identify dynamic signage/lighting in area. In one embodiment, the emergency response computer program may associate the dynamic signage/lighting with an edge.

In step 230, the emergency response computer program may create a model for area based on the identified items. The model may consist of nodes and edges, which the edges weighted based on the speed at which an individual may travel between two associated nodes. The model may be a three-dimensional model as necessary, such as if multiple floors are in the area.

In one embodiment, the emergency response computer program may implement a grid coordinate system using x, y, and z coordinates as discussed above, to model the area. The emergency response computer program may use the coordinate system to identify ingress/egress points, sensing devices, digital signage, lighting, etc.

In step 235, the emergency response computer program may optionally register electronic devices associated with individuals in the area (e.g., employees, students, etc.). For example, individuals may register their mobile devices, install an application, register their phone numbers, office location (if applicable), etc. Individuals may further identify any physical limitations or special needs required for evacuation (e.g., wheelchair ramps, etc.). Individuals may further register augmented reality devices, such as augmented reality glasses.

Figure 3:
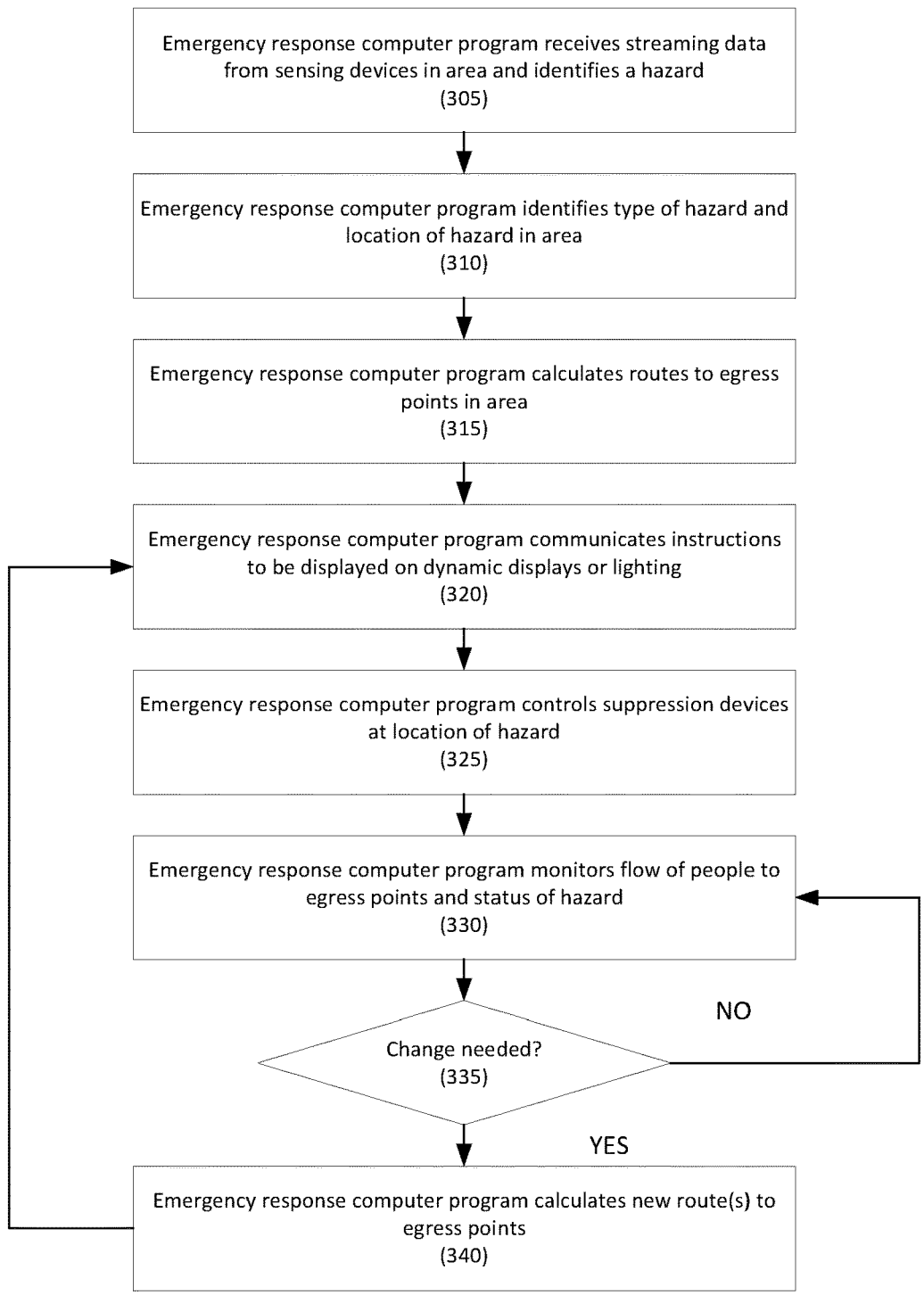
FIG. 3 depicts a method for wayfinding in hazardous environments according to an embodiment.

Referring to FIG. 3, a method for wayfinding in hazardous environments is disclosed according to another embodiment.

In step 305, the emergency response computer program may receive a real time stream of sensed data from a plurality of sensing devices in an area, and may identify a hazard in the area. For example, the emergency response computer program may review the sensed data and may identify sensed data associated with a hazard, such as the presence of heat, smoke, carbon monoxide, sounds indicative of a hazard (e.g., gunshots, glass breaking, screams, etc.).

In one embodiment, the emergency response computer program may receive raw sensed data (e.g., temperature, carbon monoxide concentration, smoke concentration, sounds, etc.) from the sensing devices, or it may receive a trigger event from one or more sensing devices. For example, a trigger event may be an event sensed by a sensing device to meet a trigger condition, such as exceeding a threshold for the sensing device, such as a temperature threshold, noise threshold, concentration threshold, etc. The communications from the sensing devices may include a sensing device identifier, such as an x, y, z coordinate-based identifier, raw data based on the type of sensing device (e.g., temperature, carbon monoxide concentration, etc.) or a trigger event (e.g., temperature above a threshold, sound above a certain dB, etc.), and a timestamp, such as the time of sensing.

In step 310, from the streaming data, the emergency response computer program may check the streaming sensed data or trigger events from the sensing devices and to see if it triggers an alarm condition including a type of hazard and location of hazard in the area. For example, the emergency response computer program may use the streaming sensed data to identify the type of hazard, and may confirm the hazard using computer vision. The emergency response computer program may further identify the location of the hazard based the sensing devices that provided the streaming data that indicated the presence of the hazard. If more than one sensing device provides sensed data indicating the presence of a hazard, the emergency response computer program may use triangulation to determine the location of the hazard.

In one embodiment, to trigger an alarm, the streaming sensed data may satisfy alarm condition rules. Alarm conditions rules may have a minimum (e.g., a minimum temperature, a minimum concentration, etc.), a maximum (e.g., a maximum temperature, a maximum concentration, etc.), and a breach period requirement—a period of time threshold—before an alarm condition is triggered. For example, if the maximum temperature was set to 150 degrees F. for 5 mins, the emergency response computer program would compare the temperature and timestamp provided in the event to determine when to trigger then alarm.

In one embodiment, confirmation from a separate sensing device may be required in order to confirm that one of the sensing devices is not malfunctioning. The confirming sensing device may provide different, but related, event data to confirm the condition. For example, if a first sensing device identifies a high temperature, even if a second sensing device may not detect a high temperature, it may detect a high smoke concentration.

As an example, referring to FIG. 1, sensing device 130 having coordinate D, 17, 3 may stream temperature data indicating the presence of fire hazard 190. Sensing device 130 G, 8, 3 may identify a high concentration of smoke. Once the alarm condition is met, the emergency response computer program may trigger an alarm condition.

In step 315, emergency response computer program may calculate routes to egress points in area using the model of the area. For example, the emergency response computer program may use the location of the hazard to modify the weight of an edge between two nodes so that the edge is not selected in calculating the route. In another embodiment, the edge may be removed. If the hazard is blocking a node, the node may be removed. Using the weightings for the edges, the emergency response computer program may calculate routes to egress points for the location of each dynamic signage/lighting.

In one embodiment, the emergency response computer program may receive or determine locations for electronic devices (e.g., mobile devices, augmented reality devices, etc.) in the area. For example, the emergency response computer program may receive locations using an installed application that interacts with one or more beacons (e.g., BLE beacon), WiFi hotspots, etc. Using the locations, the emergency response computer program may calculate individual routes for each electronic device.

In embodiments, the emergency response computer program may consider any physical limitations or requirements for the individual associated or registered to the electronic device in calculating the route.

In step 320, the emergency response computer program may communicate instructions to be displayed on dynamic displays or lighting. For example, the emergency response computer program may communicate instructions to display on each dynamic sign and instructions for dynamic lighting to illuminate in a certain manner to indicate the route. For example, the lighting may turn a certain color (e.g., green) indicating safe passage, or red indicating unsafe passage.

The emergency response computer program may also send individual routes to electronic devices.

Referring again to the example in FIG. 1, based on the location of hazard 190, the emergency response computer program may mark egress point 120 at coordinates as unavailable and route individuals away from exit 120 at coordinates D, 19, 3, and toward egress points 120 at coordinates A, 8, 3, and M, 8, 3. The emergency response computer program may change the digital signage and/or lighting to make exit 120 at coordinates D, 19, 3 unavailable and direct individuals to the other exits. The emergency response computer program may also send messages to registered electronic devices with specific directions to exit using the nearest available exit.

In step 325, the emergency response computer program may control suppression devices, such as sprinklers, fire doors, etc. to suppress or restrict the hazard.

In step 330, the emergency response computer program may monitor the flow of people to egress points and a status of hazard. If, in step 335, the speed of the flow is below a target speed, or if the hazard has changed (e.g., the fire has spread, hallways are impassable due to smoke, an active shooter has moved, etc.), in step 340, the emergency response computer program may calculate new routes to egress points, which may be the same or different egress points. In step 340, the emergency response computer program may communicate the instructions to the dynamic signage/lighting.

In embodiments, an overlay may be is added to the floor plan that may identify evacuation zones. The number and shape of the evacuation zones may depend on the shape of the area, the anticipated distribution of people in the area, etc. In a simple, non-limiting example, area 110 in FIG. 1 may be divided into six rectangular areas (not shown). Once the hazard is identified, the zone closest to the hazard may be evacuated first, followed by the other zones, sequentially moving further from the hazard. A delay may be introduced between instructions in order to avoid congestion.

In one embodiment, the emergency response computer program may inform emergency services of the location of the hazard, where it detects people, etc. It may further provide instruction for emergency services to access the hazard while minimizing interruption with its calculated routes to avoid disruptions to those routes.

In one embodiment, if the hazard is one in which individuals should shelter in place (e.g., active shooter, fire/smoke in hallway, etc.), such instructions may be provided over a speaker, to registered mobile devices, etc. Messages may be communicated using SMS, in-app messaging, push notification, email, automated dialing, etc.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for wayfinding in a hazardous environment, comprising:
   receiving, at an emergency response computer program executed by an electronic device, a plurality of real-time streams of data, each real-time stream of data from a sensing device in an area;
   detecting, by the emergency response computer program, an alarm condition in the area based on the real-time streams of data;
   determining, by the emergency response computer program, that the alarm condition satisfies an alarm condition rule;
   calculating, by the emergency response computer program, a plurality of routes to an egress point from the area using a graph representing the area comprising a plurality of nodes and a plurality of edges connecting the nodes, wherein the nodes represent sub-areas within the area, and the edges represent paths between two of the nodes, and the edges are weighted based on a speed or flow between nodes from evacuation drill data; and
   controlling, by the emergency response computer program, a digital signage in the area to display one of the plurality of routes the egress point.

2. The method of claim 1, wherein the sensing devices comprise a temperature sensor, a smoke detector, and/or a carbon monoxide detector.

3. The method of claim 1, wherein the sensing devices comprise a microphone.

4. The method of claim 1, wherein the sensing devices comprise an imaging device.

5. The method of claim 1, wherein the real-time streams comprise raw data from the sensing device, wherein the raw data comprises a sensing device identifier, a sensed data, and a timestamp.

6. The method of claim 1, wherein the real-time streams comprise a trigger event comprising a sensing device identifier, a trigger condition, and a timestamp.

7. The method of claim 1, wherein the alarm condition is associated with a fire or a violence incident.

8. The method of claim 1, wherein the alarm condition rule comprises a breach period requirement.

9. The method of claim 1, further comprising:
   receiving, by the emergency response computer program, a location of an electronic device in the area;
   calculating, by the emergency response computer program, a route from the location of the electronic device to the egress point from the area; and
   sending, by the emergency response computer program, the route to the electronic device.

10. The method of claim 1, further comprising:
    monitoring, by the emergency response computer program, a traffic volume to the egress point;
    determining, by the emergency response computer program, that the traffic volume exceeds a threshold;
    calculating, by the emergency response computer program, a second route to a second egress point; and
    controlling, by the emergency response computer program, a subset of the digital signage in the area to display the second route to the second egress point.

11. A system, comprising:
    a plurality of sensing devices in an area; and
    an electronic device comprising a memory storing an emergency response computer program and a computer processor;
    wherein:
      the emergency response computer program receives a real-time stream of data from each of the plurality of sensing devices;
      the emergency response computer program detects an alarm condition in the area based on the real-time streams of data;
      the emergency response computer program determines that the alarm condition satisfies an alarm condition rule;
      the emergency response computer program calculates a plurality of routes to an egress point from the area using a graph representing the area comprising a plurality of nodes and a plurality of edges connecting the nodes, wherein the nodes represent sub-areas within the area, and the edges represent paths between two of the nodes, and the edges are weighted based on a speed or flow between nodes from evacuation drill data; and the emergency response computer program controls a digital signage or lighting in the area to display or illuminate one of the plurality of routes the egress point.

12. The system of claim 11, wherein the sensing devices comprise a temperature sensor, a smoke detector, a carbon monoxide detector, an imaging device and/or a microphone.

13. The system of claim 11, wherein the electronic device is a cloud-based electronic device.

14. The system of claim 11, wherein the real-time streams comprise raw data from the sensing device, wherein the raw data comprises a sensing device identifier, a sensed data, and a timestamp.

15. The system of claim 11, wherein the real-time streams comprise a trigger event comprising a sensing device identifier, a trigger condition, and a timestamp.

16. The system of claim 11, wherein the alarm condition is associated with a fire or a violence incident.

17. The system of claim 11, wherein the alarm condition rule comprises a breach period requirement.

18. The system of claim 11, wherein the emergency response computer program further receives a location of an electronic device in the area, calculates a route from the location of the electronic device to the egress point from the area, and sends the route to the electronic device.

* * * * *